United States Patent [19]
Hacker et al.

[11] Patent Number: 5,058,638
[45] Date of Patent: Oct. 22, 1991

[54] APPARATUS FOR CROSS-CUTTING TREETRUNKS, COMPRISING A DEVICE FOR MEASURING LENGTHS

[75] Inventors: Gerold Hacker; Walter Strzygowski, both of Vienna, Austria

[73] Assignee: Steyr-Daimler-Puch AG, Vienna, Austria

[21] Appl. No.: 618,471

[22] Filed: Nov. 27, 1990

[30] Foreign Application Priority Data

Aug. 10, 1990 [DE] Fed. Rep. of Germany ... 9011682[U]

[51] Int. Cl.$^5$ ...................... A01G 23/08; B27L 1/00; B27B 1/00
[52] U.S. Cl. .................................. 144/3 D; 144/2 Z; 144/356; 144/338; 144/335; 144/246 F; 144/246 C; 144/343
[58] Field of Search ..................... 144/2 Z, 3 D, 34 R, 144/356, 338, 335, 343, 246 F, 246 C

[56] References Cited

U.S. PATENT DOCUMENTS

| | | | |
|---|---|---|---|
| 4,239,067 | 12/1980 | Mononen | 144/338 |
| 4,250,935 | 2/1981 | Helgesson et al. | 144/2 Z |
| 4,257,461 | 3/1981 | Wangeby et al. | 144/2 Z |
| 4,549,588 | 10/1985 | Forslund | 144/356 |
| 4,974,648 | 12/1990 | Propst | 144/3 D |

Primary Examiner—W. Donald Bray
Attorney, Agent, or Firm—Marmorek, Guttman & Rubenstein

[57] ABSTRACT

An apparatus for cross-cutting a treetrunk comprises gripping members which embrace the treetrunk, a feeding mechanism for moving the treetrunk in its longitudinal direction, and a saw which moves transversely to the longitudinal direction and cuts the treetrunk into predetermined lengths. One of the gripping members includes a rotatable guide roller having peripherally spaced apart teeth which engage the treetrunk. The apparatus also comprises a displacement pickup unit which ensures that the treetrunk is cut to a predetermined length. The displacement pickup unit is connected to the guide roller and detects the number of rotations of the guide roller, thereby detecting the longitudinal displacement of the treetrunk. The displacement pickup unit is located within the gripping member so that it is shielded from outside influences.

7 Claims, 3 Drawing Sheets

APPARATUS FOR CROSS-CUTTING TREETRUNKS, COMPRISING A DEVICE FOR MEASURING LENGTHS

BACKGROUND TO THE INVENTION

1. Field of the Invention

This invention relates to an apparatus for cross-cutting treetrunks, comprising a frame, which is provided with gripping members for engaging a treetrunk from below, with feeding means for imparting a longitudinal movement to the treetrunk, and with a cross-cutting tool, which us operable to move transversely to the longitudinal feeding direction. The devices also comprises a device for measuring lengths.

2. Description of the Prior Art

Such apparatuses are mounted on a suitable vehicle, in most cases suspended from a crane, and are lowered onto the felled tree while the gripping members are open. Thereafter the gripping members engage the treetrunk and support and guide the treetrunk during its further processing. The feeding means move the tree, in most cases past lopping knives, to a cross-cutting device, by means of which the treetrunk is cut into logs having the same length or into logs each having an exactly predetermined length.

In order to permit cross-cutting of the tree into logs having a predetermined length, a measuring device is required, which measures the distance over which the treetrunk has been fed and which causes the treetrunk to be arrested when it has been fed over the predetermined length.

Such an apparatus is known, e.g., from a prospectus of Valmet Logging AB (Prospectus No. 5999 653, May 1989). Lengths are measured by means of a measuring wheel, which is mounted in the frame of the apparatus and is covered in part by a guard for protection.

That arrangement has the disadvantage that the measuring wheel may temporarily disengage the treetrunk if it is curved or uneven, or that the measuring wheel, if it is mounted in a soft spring suspension, will follow any uneven portion of the surface of the surface of the treetrunk. In both cases the accuracy of the measurement will be considerably affected. Besides, the measuring wheel is relatively weak as it is not normally required to transmit forces, and is either exposed, whereby it can easily be damaged or, if it protrudes through an opening from the frame, it may be blocked by wedged bark pieces.

Another apparatus of the kind described hereinbefore is disclosed in a prospectus "Steyr Tree Processor KP 40" of Steyr Forsttechnik Ges.m.b.H. The device for measuring lengths described therein is coupled to the drive means of the feeding means. Whereas that arrangement results in a very robust and reliable structure, some slippage occurs and results in false measurements.

SUMMARY OF THE INVENTION

For this reason it is an object of the present invention to design an apparatus which is of the kind described hereinbefore which can measure lengths with a high accuracy even in very rough and dirty usage and particularly avoids blocking by pieces of bark.

That object is accomplished in accordance with the invention in that an apparatus of the kind described first hereinbefore comprises exposed rollers, which are rotatably mounted on gripping arms and at least one of which comprises on the outside a plurality of peripherally spaced apart teeth. A displacement pickup is also provided, which comprises means which are operatively associated with said at least one roller and are accommodated within said gripping member and shielded from the outside.

As a result, the displacement of the treetrunk is measured by the rollers which are provided anyway for guiding the treetrunk and therefore are robust. Because said rollers are not driven and are exposed, there can be no slippage and no clamping of bark pieces. Measuring errors will be reduced because said guide rollers are relatively large in diameter. The displacement pickup comprises means which are protected from undesired influences because they are accommodated within the gripping members. The combination of all these advantages has the result that the actual log length, which is the straight-line normal distance between the two end faces of the log, will be measured with high accuracy.

In an embodiment of the invention the displacement pickup is constituted by an inductive pickup, which is mounted on a fixed baseplate and which scans marks which are provided on the adjacent end face of the shell of the roller. Owing to the mechanical strength of the inductive pickup and its arrangement in accordance with the invention the arrangement is particularly simple and reliable.

In another embodiment, the displacement pickup comprises a pulse-generating angle encoder, which comprises a gear, which protrudes into the interior of the shell of the roller, which is formed with gear teeth in mesh with said gear.

In a development of the last-mentioned embodiment, said gear teeth of the roller are constituted by internal teeth of a ring gear, which is secured to the roller shell by suitable means, such as screws or an adhesive joint. In that case the roller shell can be joined in a relatively simple and inexpensive manner to a ring gear, which is protected and is not required to transmit substantial forces so that it may consist of plastic.

In another embodiment of the invention the peripherally spaced apart teeth are provided on a toothed ring, which is welded to the roller shell. A plurality of such toothed rings may be welded to the roller shell and desirably are equal in diameter so that the measurement will not be falsified even during handling of treetrunks which vary greatly in diameter.

DETAILED DESCRIPTION OF THE PREFERRED EMBODIMENTS

Figure 1:
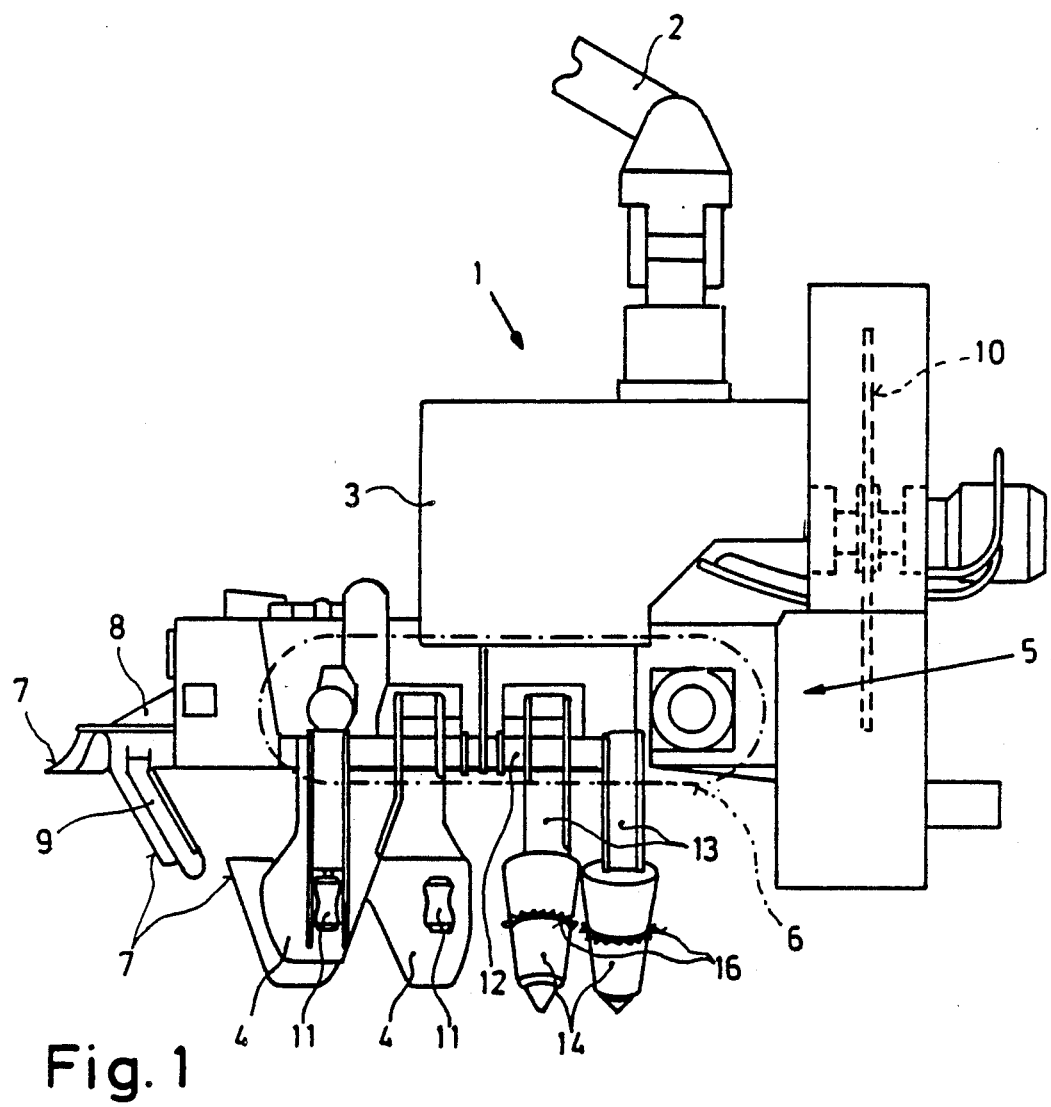
FIG. 1 is a diagrammatic representation showing an apparatus which embodies the invention.

Embodiments of the invention will now be described with reference to the drawings.

An apparatus 1 for cross-cutting treetrunks and optionally for lopping felled trees comprises a frame 3, which is adapted to be suspended, e.g., from a jib 2 of a lifting tackle, not shown. The frame 3 is provided with downwardly protruding gripping members 4, which are pivoted on pivots 12 and serve to engage a treetrunk from below and to support the treetrunk. The frame 3 is also provided with feeding means 5, which comprise a revolving endless coupling chain 6 for imparting a longitudinal movement to a treetrunk when it has been embraced by the grippers 4. In its tree-receiving portion, the frame is also provided with lopping tools 7, which are distributed around the periphery of the treetrunk. To permit an adaptation of the lopping tools 7 to the diameter of various length portions of the treetrunk, the lopping tools are secured to movable holders 8 or pivoted arms 9 or directly to the gripping members 4 which are provided near the entrance end of the frame 3.

When a treetrank has been embraced by the gripping members 4 and the coupling chain 6 of the feeding means 5 is operated to move the treetrunk in its longitudinal direction between the lopping tools 7, the tree will automatically be lopped along the periphery of the treetrunk. In order to permit a lopped treetrunk section to be severed by the apparatus from the remainder of the treetrunk, the frame 3 is provided at its delivery end with a saw 10, such as a circular saw. When the treetrunk has been lopped along a predetermined length portion having a measurable length, or has been fed along a predetermined length and has been lopped along a portion having a corresponding length, the feeding means 5 will be stopped and the saw 10 can then be operated to saw off the lopped length portion of the treektrunk.

In order to facilitate the longitudinal feeding and to reduce the friction involved as the treetrunk is pulled through the frame 3, each gripping member 4 comprises as a carrier a guide roller 11, which laterally supports the treetrunk and is mounted on a pivot 12 that is at right angles to the feeding direction. The gripping members also include two gripping arms 13, which are also pivoted to the associated pivot 12 and each of which carries at its outer end an exposed guide roller 14, which is provided on the outside with peripherally spaced apart teeth 16. Such teeth 16 may be provided on one or both of the guide rollers 14. In the latter case the results of the measurement obtained from both rollers 14 may be used for a comparison or for a determination of an average.

Figures 2, 3:
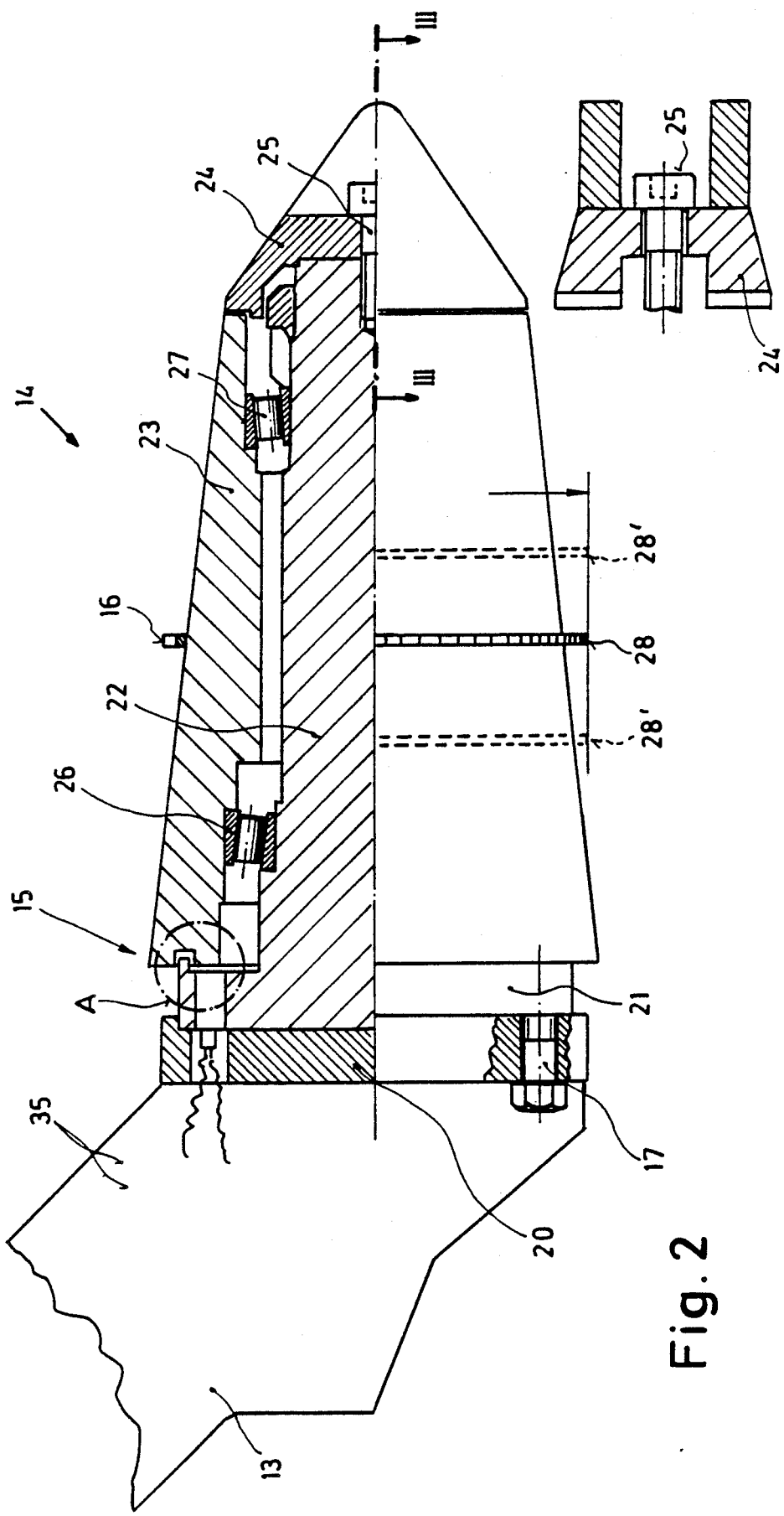
FIG. 2 is an enlarged sectional view showing a guide roller which is arranged in accordance with the invention and is associated with a preferred embodiment of a displacement pickup.
FIG. 3 is a sectional view taken along line III—III in FIG. 2.

It is apparent from FIG. 2 that a carrying plate 20 is secured to a gripper arm 13, e.g., by welding. A baseplate 21 provided with an axle 22 is detachably secured to the carrying plate 20 by means of screws 17. A roller shell 23 is rotatably mounted on the axle 22 by means of rolling-element bearings. The design, mounting and sealing of the bearings may be selected as desired. One claw 24 (see also FIG. 3) for engaging the treetrunk from below is secured to the outer end of the axle 22. A displacement pickup 15 is mounted on the baseplate 21 and is operatively associated with the roller shell 23.

Figure 4:
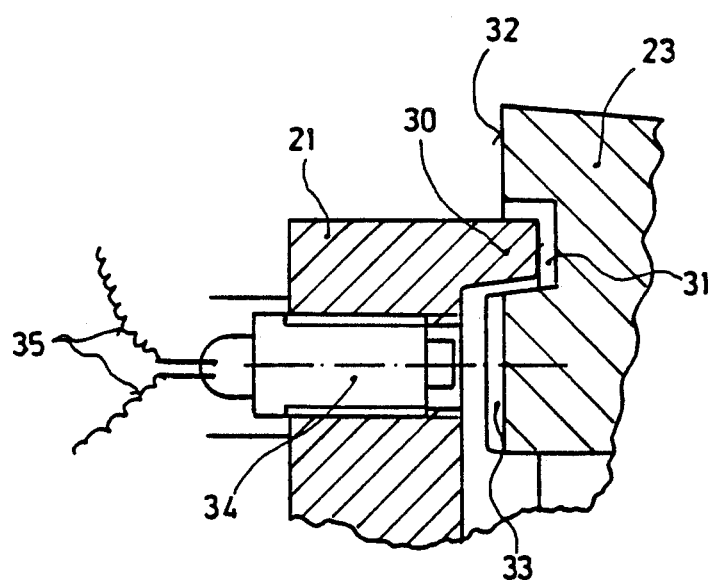
FIG. 4 shows the detail A in FIG. 2 on a much larger scale.

A preferred embodiment of the displacement pickup 15 shown on a larger scale in FIG. 4. The baseplate 21 is formed with an annular sealing rib 30, which extends into a sealing groove 31 formed in the adjacent end face of the roller shell 23 so that an ingress of foreign matter into the interior of the roller shell 23 will be prevented. Radially inwardly of the sealing groove 31 the roller shell 23 is provided on its end face 32 facing the baseplate 21 with radially extending ribs 33, which have a regular, small angular spacing and are either integrally formed on the end face 32 or on an annular member, which is mounted on said end face. The baseplate 21 has a bore, which accommodates a pulse generator 34, which consists of an inductive pickup and is so spaced from the axis of rotation of the roller shell 23 that said pulse generator is disposed opposite to and in operation scans the ribs 33. Whenever one of the ribs 33 moves past the inductive pickup 34, the latter will deliver a signal. The angular spacing of the ribs 33 will be selected in dependence on the required accuracy of the measurement. The inductive pickup 34 is connected by lines 35 to a suitable controlling processor, which is not shown.

Figure 5:
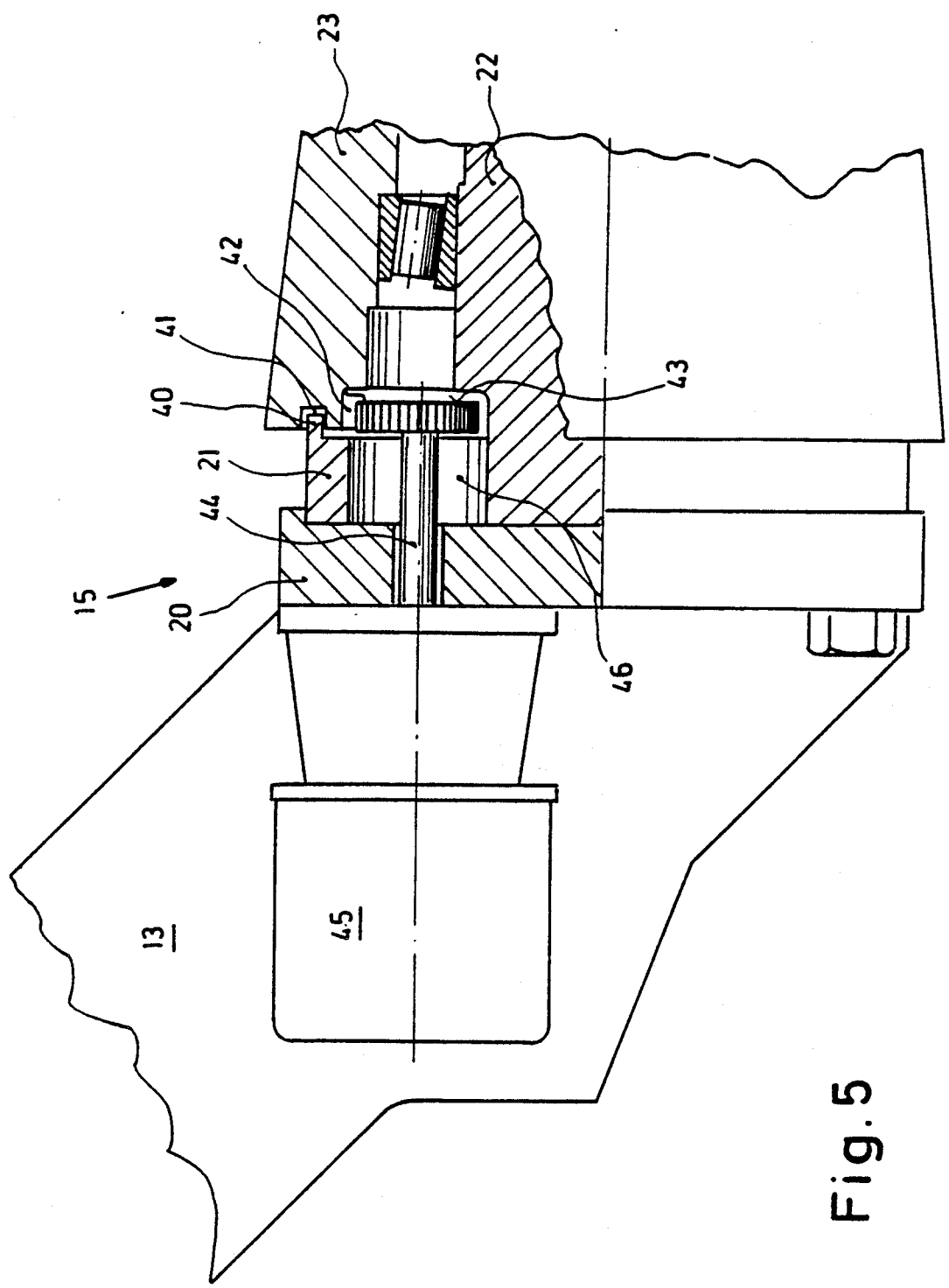
FIG. 5 is a fragmentary view that is similar to FIG. 2 and shows on a further increased scale another embodiment of the guide roller and associated parts of a gripping member in accordance with the invention.

Another embodiment of the displacement pickup 15 is illustrated in FIG. 5 and differs from the embodiment shown in FIGS. 2 to 4 only in that an angle-encoding pulse generator 45 is connected by screws to the carrying plate 20 on the side which faces the gripper arms 13 and that a shaft 44 of the pulse generator 45 extends through the carrying plate 20 and through a bore 46 in the baseplate 21 into the interior of the roller shell 23. Within the roller shell 23, the shaft 44 is nonrotatably connected to a gear 43, which meshes with a ring gear 42, which is secured to the inside surface of the roller shell 23.

It is apparent that the gears 42, 43 of the displacement pickup 15 are accommodated within the roller shell 23 of the gripper member 4 in such a manner that said gears cannot be damaged by treetrunks being handled and are protected against an ingress of dirt by the sealing rib 40.

From FIG. 2 it is apparent that the teeth 16 are formed on a ring 28, which can be manufactured very simply from sheet metal and is welded to the roller shell 23. The teeth 16 should be as sharp as possible so that they will be entrained by the treetrunk without a slip. They may be made simply as peripherally spaced apart teeth defined by arcs of a circle. Two such toothed rings 28' are indicated by broken lines and have the same outer diameter.

Numerous modifications from said illustrative embodiments may be adopted within the scope of the invention. For instance, the displacement pickups may be of various inductive, capacitive or optical types, such as are commercially available in various forms. Besides, the roller shells 23 may alternatively be cylindrical.

We claim:

1. An apparatus for cross-cutting treetrunks, comprising:
   a frame;
   a plurality of gripping member means movably mounted in said frame for engaging a treetrunk, wherein at least one of said gripper member means comprises a gripper arm, on which an exposed roller is rotatably mounted, said exposed roller having an outside peripheral surface provided with peripherally spaced apart teeth for engaging said treetrunk;
   feeding means mounted in said frame for engaging and longitudinally moving said treetrunk in a predetermined longitudinal direction relative to said frame when said treetrunk is thus engaged by said gripper member means;

cross-cutting tool means mounted in said frame and movable at right angles to said longitudinal direction for crosscutting said treetrunk thus engaged by said gripping member means; and displacement pickup means associated with said roller and located within said at least one gripper member means for detecting the number of rotations of said roller as said treetrunk moves in said longitudinal direction thereby detecting the displacement of said treetrunk relative to said frame in said longitudinal direction;

said at least one gripping member means comprising shielding means for shielding said displacement pickup means from outside influences.

2. An apparatus as set forth in claim 1, wherein
a baseplate is fixed to said gripper arm,
said roller comprises a roller shell having an end face adjacent to and facing said baseplate and provided with angularly spaced marks, and
said displacement pickup means comprises an inductive pickup, which is mounted on said baseplate and arranged to scan and detect said marks.

3. An apparatus as set forth in claim 1, wherein
said roller comprises a hollow roller shell having an inside peripheral surface provided with an annular array of teeth and
said displacement pickup means comprises an angleencoding pulse generator comprising a gear, which extends into the interior of said roller shell and is in mesh with said annular array of teeth.

4. An apparatus as set forth in claim 3, wherein
said annular array of teeth is provided on a ring gear secured to said inside peripheral surface of said roller shell.

5. An apparatus as set forth in claim 1, wherein said peripherally spaced apart teeth are provided on a ring which is welded to said roller.

6. An apparatus as set forth in claim 1, wherein
a plurality of rings are welded to said outside peripheral surface of said roller and
each of said rings is formed with an annular array of said peripherally spaced apart teeth.

7. An apparatus as set forth in claim 6, wherein said annular arrays are equal in outside diameter.

* * * * *